United States Patent
Kim

(10) Patent No.: US 9,063,332 B2
(45) Date of Patent: Jun. 23, 2015

(54) LIGHT SCREENING APPARATUS AND ELECTRONIC DEVICE INCLUDING THE SAME

(75) Inventor: Che-Heung Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 492 days.

(21) Appl. No.: 13/230,058

(22) Filed: Sep. 12, 2011

(65) Prior Publication Data

US 2012/0154887 A1    Jun. 21, 2012

(30) Foreign Application Priority Data

Dec. 17, 2010    (KR) .................. 10-2010-0130250

(51) Int. Cl.
*G02B 26/02* (2006.01)
*G02B 1/116* (2015.01)
(Continued)

(52) U.S. Cl.
CPC ............... *G02B 26/02* (2013.01); *G02B 1/116* (2013.01); *G02B 5/005* (2013.01); *G02B 26/0841* (2013.01); *G03B 9/08* (2013.01); *H04N 5/2254* (2013.01); *G09G 3/2018* (2013.01); *G09G 3/3433* (2013.01); *G09G 2300/0456* (2013.01)

(58) Field of Classification Search
CPC .. G02B 26/02; G02B 26/023; G02B 26/0841; G02B 26/04; G02B 5/005; G02B 26/005; G02B 26/0833; G02B 5/008; G02B 26/085; G02B 6/353; G02B 19/0014; G02B 19/0019; G02B 19/0042; G02B 19/0052; G02B 1/116; G02B 2027/0118

USPC .......... 359/227, 230, 257, 261, 290; 396/479, 396/481
See application file for complete search history.

(56) References Cited

U.S. PATENT DOCUMENTS 3,989,357 A    11/1976 Kalt
4,235,522 A    11/1980 Simpson et al.
(Continued)

FOREIGN PATENT DOCUMENTS

EP    1 008 885 A1    6/2000
EP    1 241 507 A2    9/2002
(Continued)

OTHER PUBLICATIONS

European Search Report dated Sep. 10, 2010, in Application No. 10155823.7.
(Continued)

*Primary Examiner* — Thomas K Pham
*Assistant Examiner* — Sharrief Broome
(74) *Attorney, Agent, or Firm* — Sughrue Mion, PLLC

(57) ABSTRACT

A light screening apparatus and an electronic device including the light screening apparatus are provided, where the electronic device could be an imaging device or a display device. The light screening apparatus includes a base plate, a rollup blade, and a driving unit. The base plate includes a lower electrode and a light transmitting portion through which light passes. The rollup blade includes an upper electrode and at least two layers having different optical properties. The driving portion is electrically connected to the base plate and the rollup blade, and it controls the amount of light passing through the light transmitting portion of the base plate. The outer circumferential surface of the rollup blade, when in a rolled-up position, may be an anti-reflection surface.

35 Claims, 17 Drawing Sheets

(51) Int. Cl.
  *G02B 5/00* (2006.01)
  *G02B 26/08* (2006.01)
  *G03B 9/08* (2006.01)
  *H04N 5/225* (2006.01)
  *G09G 3/34* (2006.01)
  *G09G 3/20* (2006.01)

(56) References Cited

U.S. PATENT DOCUMENTS

| | | | |
|---|---|---|---|
| 4,248,501 A | 2/1981 | Simpson | |
| 4,266,339 A | 5/1981 | Kalt | |
| 5,233,459 A | 8/1993 | Bozler et al. | |
| 5,605,609 A * | 2/1997 | Ando et al. | 204/192.23 |
| 5,646,770 A | 7/1997 | Sato et al. | |
| 5,781,331 A | 7/1998 | Carr et al. | |
| 5,847,454 A | 12/1998 | Shaw et al. | |
| 5,959,763 A | 9/1999 | Bozler et al. | |
| 6,067,183 A * | 5/2000 | Furlani et al. | 359/254 |
| 6,226,116 B1 | 5/2001 | Dowe et al. | |
| 6,313,937 B1 | 11/2001 | Dowe et al. | |
| 6,443,637 B1 | 9/2002 | Dowe | |
| 6,586,738 B2 | 7/2003 | Dausch et al. | |
| 6,594,058 B2 | 7/2003 | Flanders | |
| 6,972,889 B2 | 12/2005 | Goodwin-Johansson et al. | |
| 7,436,102 B2 | 10/2008 | Fujii et al. | |
| 7,766,563 B2 | 8/2010 | Wakabayashi | |
| 8,061,910 B2 | 11/2011 | Kim et al. | |
| 8,147,150 B2 | 4/2012 | Kim et al. | |
| 8,313,663 B2 | 11/2012 | Hautala | |
| 2003/0203237 A1 | 10/2003 | Webb et al. | |
| 2004/0046123 A1 | 3/2004 | Dausch | |
| 2006/0007517 A1 | 1/2006 | Tsai | |
| 2006/0078331 A1 | 4/2006 | Masuda | |
| 2006/0196613 A1 | 9/2006 | Lamontagne et al. | |
| 2007/0279558 A1 * | 12/2007 | Chang | 349/113 |
| 2008/0192326 A1 * | 8/2008 | Mizumaki et al. | 359/234 |
| 2009/0142050 A1 * | 6/2009 | Kim et al. | 396/480 |
| 2010/0118373 A1 | 5/2010 | Kim | |
| 2010/0142024 A1 | 6/2010 | Kim | |
| 2010/0290101 A1 | 11/2010 | Kim et al. | |
| 2010/0330468 A1 | 12/2010 | Kwon et al. | |
| 2011/0170158 A1 | 7/2011 | Hong et al. | |
| 2012/0154887 A1 | 6/2012 | Kim | |

FOREIGN PATENT DOCUMENTS

| | | | |
|---|---|---|---|
| EP | 1 241 508 | * | 9/2002 |
| EP | 1 241 508 A2 | | 9/2002 |
| JP | 08-220592 A | | 8/1996 |
| JP | 10-153704 A | | 6/1998 |
| JP | 11-72722 A | | 3/1999 |
| JP | 11-167078 A | | 6/1999 |
| JP | 2006-23695 A | | 1/2006 |
| JP | 2008-040006 A | | 2/2008 |
| JP | 2009-134248 A | | 6/2009 |
| KR | 1998-016031 A | | 5/1998 |
| KR | 10-2007-0030871 A | | 3/2007 |
| KR | 10-2009-0055996 A | | 6/2009 |
| WO | 89/01217 A1 | | 2/1989 |
| WO | 2006/099512 A2 | | 9/2006 |

OTHER PUBLICATIONS

Communication, dated Nov. 15, 2013, issued by the European Patent Office in counterpart European Patent Application No. 11193763.7.

Non-Final Office Action, dated Dec. 5, 2013 in related U.S. Appl. No. 12/907,236.

Advisory Action, dated Aug. 2, 2013 in related U.S. Appl. No. 12/907,236.

Final Office Action, dated Apr. 25, 2013 in related U.S. Appl. No. 12/907,236.

Non-Final Office Action, dated Dec. 7, 2012 in related U.S. Appl. No. 12/907,236.

Restriction/Election Requirement, dated Sep. 14, 2012 in related U.S. Appl. No. 12/907,236.

Final Office Action, dated Sep. 10, 2013 in related U.S. Appl. No. 13/451,273.

Non-Final Office Action, dated Mar. 14, 2013 in related U.S. Appl. No. 13/451,273.

Notice of Allowance, dated Jul. 14, 2011 in related U.S. Appl. No. 12/134,324.

Final Office Action, dated Nov. 15, 2010 in related U.S. Appl. No. 12/134,324.

Non-Final Office Action, dated May 14, 2010 in related U.S. Appl. No. 12/134,324.

Notice of Allowance, dated Jun. 28, 2013 in related U.S. Appl. No. 12/692,285.

Restriction/Election Requirement, dated Jan. 3, 2013 in related U.S. Appl. No. 12/692,285.

Extended European Search Report, dated Aug. 6, 2012, issued by the European Patent Office in counterpart European Application No. 11193763.7.

Communication from the Japanese Patent Office dated Mar. 3, 2015 in a counterpart Japanese application No. 2011-276106.

* cited by examiner

LIGHT SCREENING APPARATUS AND ELECTRONIC DEVICE INCLUDING THE SAME

CROSS REFERENCE TO RELATED APPLICATION

This application claims priority under 35 U.S.C. §119 to Korean Patent Application No. 10-2010-0130250, filed on Dec. 17, 2010, in the Korean Intellectual Property Office, the entire disclosure of which is incorporated herein by reference.

BACKGROUND

1. Field

Exemplary embodiments of the following description relate to an optical apparatus, a light screening apparatus, and an electronic device including the light screening apparatus.

2. Description of the Related Art

A light screening apparatus is a device that transmits or blocks incident light. An optical shutter, which is one type of light screening apparatus, is used to selectively transmit or block light. For example, an optical shutter included in a camera selectively transmits light passing through the camera's lens and to an image sensor. Generally, such a camera controls a time period during which light is transmitted to the image sensor and/or the amount of light incident on the image sensor by controlling an operating speed of the optical shutter and/or an opening size of an aperture of the camera. Light screening apparatuses such as optical shutters have been utilized for various electronic devices, such as optical switching devices, which require a permanent or temporary light-screening function, or require a selective blocking or transmitting of incident light.

There are different types of optical shutters including mechanically operating optical shutters and electronically operating optical shutters. In an electronically operating optical shutter, an on/off status of an image sensor is controlled in order to control a time during which the image sensor receives light or to limit the amount of light received by the image sensor. Since an electronically operating optical shutter operates according to a predetermined circuit configuration, electronically operating optical shutters have been widely used in a portable digital cameras. However, such electronically operating optical shutters have a drawback in that image dragging may occur as the number of pixels included in a camera module increases. Image dragging generally occurs in electronic rolling shutter (ERS) systems because an image in an ERS system is captured by activating the image sensors sequentially from one corner (e.g. the left, top corner) to an opposite corner (e.g. the right, bottom corner) of the pixel matrix. Therefore, when an object is moving quickly, there is a position change of the object during the time that the image sensors are being sequentially activated. This causes an unwanted image dragging effect.

Recently, the number of pixels in a camera module for a mobile device, such as a mobile phone, a gaming device, a camera or the like, has been increased significantly in order to obtain a high quality image, and thus the interest in a mechanically operating optical shutters has increased. A recent tendency in the mobile device industry is to make the device smaller and thinner, and thus mechanically operating optical shutters need to be smaller and thinner while continuing to operate with a fast response (shuttering) speed. Korean patent application publication No. 2009-0055996, published on Jun. 30, 2009, entitled "Shutter and Micro Camera Module Having the Same" describes an example of a mechanically operating optical shutter that uses a plurality of rollup blades to achieve a high response speed.

Most electronic devices include a display device, such as a Liquid Crystal Display (LCD) touch screen. Demand for a display device providing high quality images and performance is continuously increasing. In order to meet these needs, manufacturing technologies for display devices have been improved significantly and continuously to obtain better display devices. Two different kinds of display devices have been developed for electronic devices. These are transmission-type devices and reflection-type devices. In a transmission-type display device, images are displayed using light transmitted through a panel, and in a reflection-type display device images are displayed using light reflected from a panel. Transmission-type display devices have high visibility in dark environments, but have relatively low visibility in bright outdoor or indoor environments. On the other hand, reflection-type display devices have visibility in dark environments, but have relatively high visibility in bright environments.

One type of translucent display device takes advantage of both transmission-type and reflection-type displays. This translucent display device can be selectively operated either in a reflection mode or in a transmission mode according to the brightness of a surrounding environment. Therefore, the translucent display device is very beneficial for use in a mobile electronic device which is operated in various lighting conditions. Generally, cells in the translucent display device are divided into two parts. One part of each of the cells has a reflection type structure, and the other part of each of the cells has a transmission type structure. As a result, the translucent display has a relatively low brightness compared to existing single-mode displays (i.e. a transmission-type display or a reflection-type display).

SUMMARY

One or more exemplary embodiments provide a light screening apparatus that can prevent undesired light reflection.

One or more exemplary embodiments provide an imaging device that can obtain high quality images by preventing formation of noise patterns with a light screening apparatus.

One or more exemplary embodiments provide a display that can selectively operate a light screening apparatus either in a transmission mode or in a reflection mode, and provide excellent visibility comparable to currently available single-mode display systems in both the transmission mode and the reflection mode as well.

According to an aspect of an exemplary embodiment, there is provided a light screening apparatus including a base plate, a rollup blade, and a driving unit. The base plate includes a lower electrode, and the rollup blade includes an upper electrode. The rollup blade is disposed to correspond to a light transmitting portion of the base plate when the rollup blade is in a flattened position and includes at least two layers having different optical properties. The driving unit is electrically connected to the lower electrode and the upper electrode, and drives the rollup blade to adjust the amount of light passing through the light transmitting portion.

According an aspect of another exemplary embodiment, there is provided an imaging device including an image sensor, a base plate, a rollup blade, and a driving unit. The base plate includes a lower electrode, and the rollup blade includes an upper electrode. A light transmitting portion of the base plate is disposed corresponding to the image sensor. The rollup blade is disposed corresponding to the light transmitting portion of the base plate when the rollup blade is in a flattened position, and includes at least two layers having different optical properties. The driving unit is electrically connected to the upper and lower electrodes, and drives the rollup blade to adjust the amount of light passing through the light transmitting portion.

According to an aspect of another exemplary embodiment, there is provided a display including a back light unit, a rollup blade, a color filter, and a driving unit. The base plate includes a lower electrode and is disposed over the back light unit. The rollup blade includes an upper electrode. The color filter is disposed over the rollup blade. The rollup blade is disposed corresponding to a light transmitting portion of the base plate when the rollup blade is in a flattened position, and includes at least two layers having different optical properties. In addition, the driving unit is electrically connected to the upper and lower electrodes, and drives the rollup blade to adjust the amount of light passing through the light transmitting portion.

Other features and aspects will be apparent from the following detailed description, the drawings, and the claims.

Figure 1:
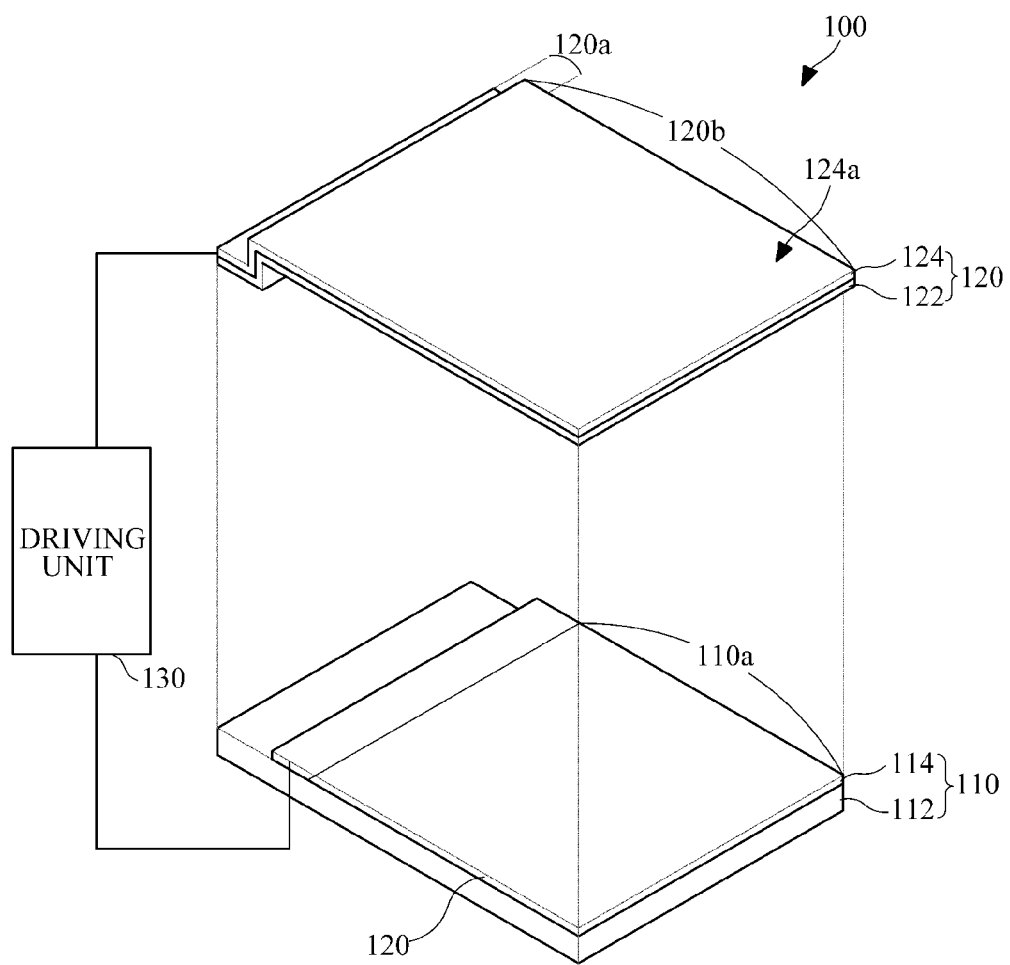
FIG. 1 is a perspective view illustrating an exemplary embodiment of a light screening apparatus when the light screening apparatus screens light.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Various exemplary embodiments will now be described more fully with reference to the accompanying drawings in which some exemplary embodiments are shown. However, specific structural and functional details disclosed herein are merely representative for purposes of describing exemplary embodiments. Thus, the embodiments may encompass many alternate forms and should not be construed as limited by the following description. Therefore, it should be understood that there is no intent to limit exemplary embodiments to the particular forms disclosed, but on the contrary, exemplary embodiments are to cover all modifications, equivalents, and alternatives as would be understood by one of skill in the art.

In the drawings, the thicknesses of layers and regions may be exaggerated for clarity, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). Further, the meaning that a first material layer is formed on a second material layer has to be interpreted to include all the cases that the first material layer is formed directly on the second material layer and that another third material layer is inserted between the second material layer and the first material layer, if there is no explicit description excluding the cases.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Exemplary embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, exemplary embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to more specifically describe exemplary embodiments, various aspects will be described in detail with reference to the attached drawings. However, the present invention is not limited to exemplary embodiments described.

Figure 2A:
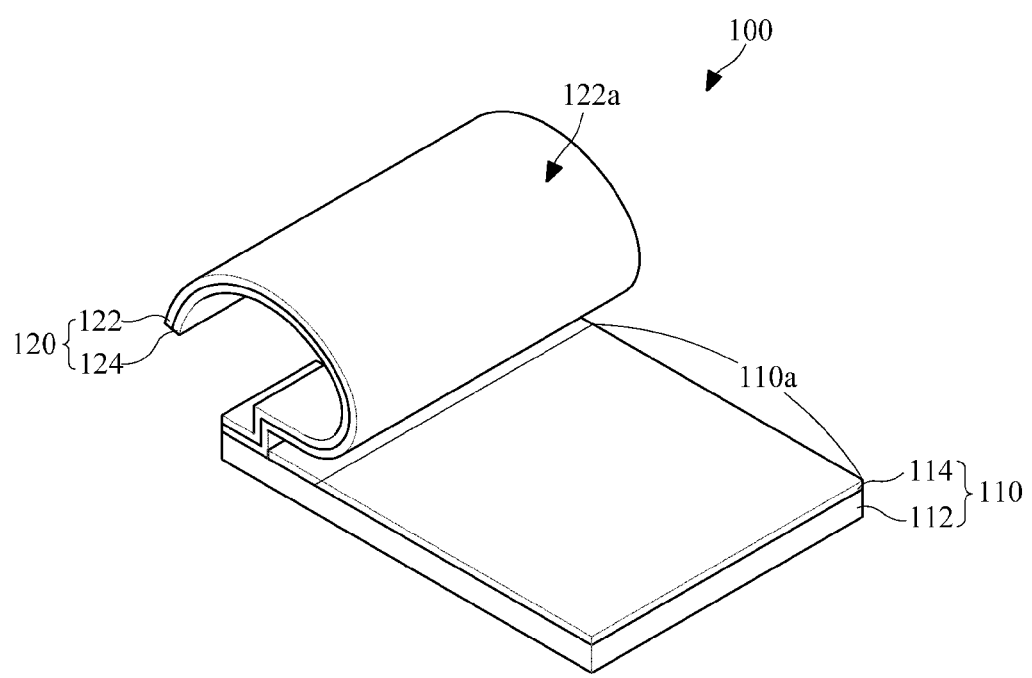
FIG. 2A is a perspective view illustrating the light screening apparatus of FIG. 1 when the light screening apparatus transmits light.
Figure 2B:
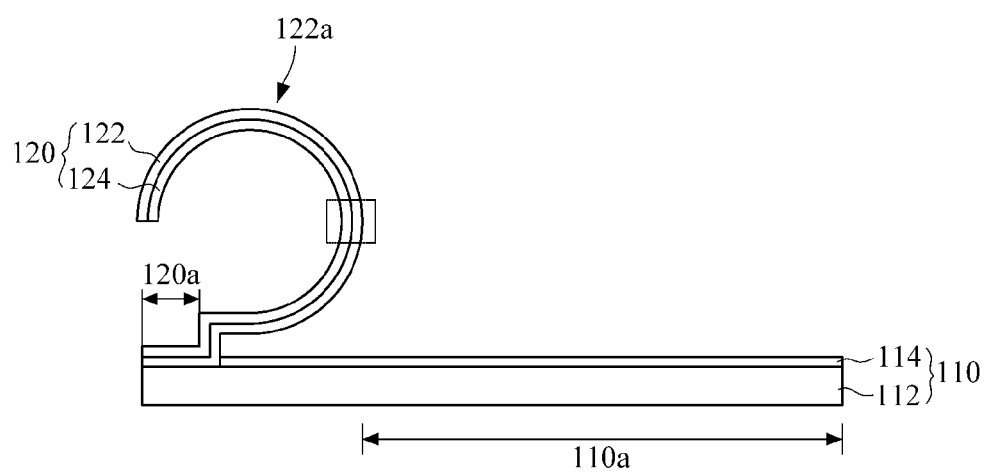
FIG. 2B is a side view illustrating the light screening apparatus illustrated in FIG. 2A.
Figure 5A:
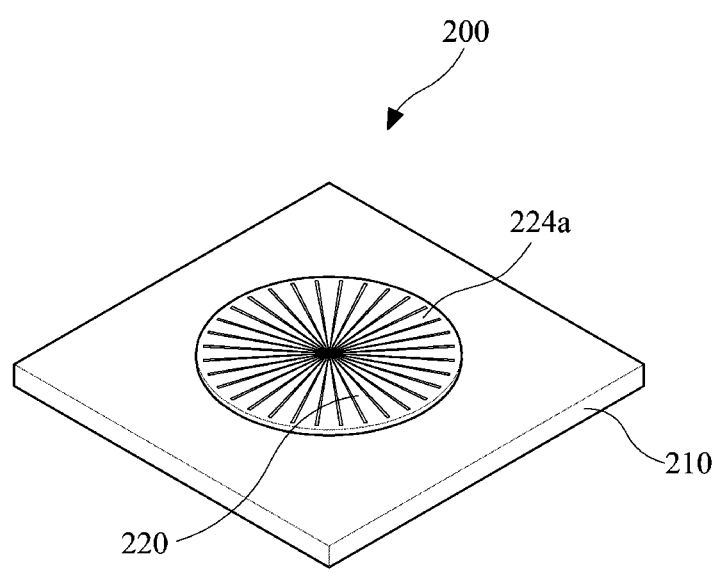
FIG. 5A is a perspective view illustrating another exemplary embodiment of a light screening apparatus when the light screening apparatus screens light.
Figure 5B:
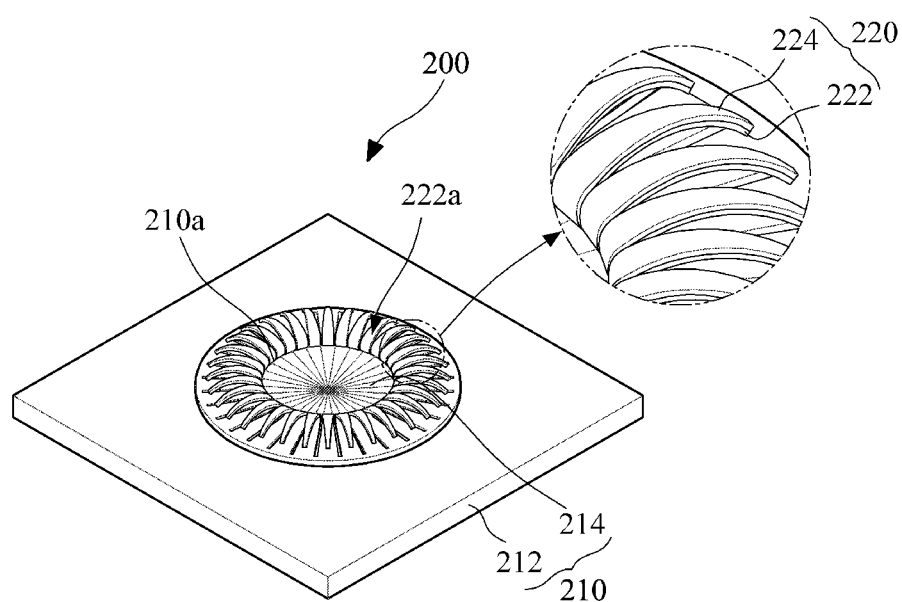
FIG. 5B is a perspective view illustrating the light screening apparatus of FIG. 5A when the light screening apparatus transmits light.
Figure 7A:
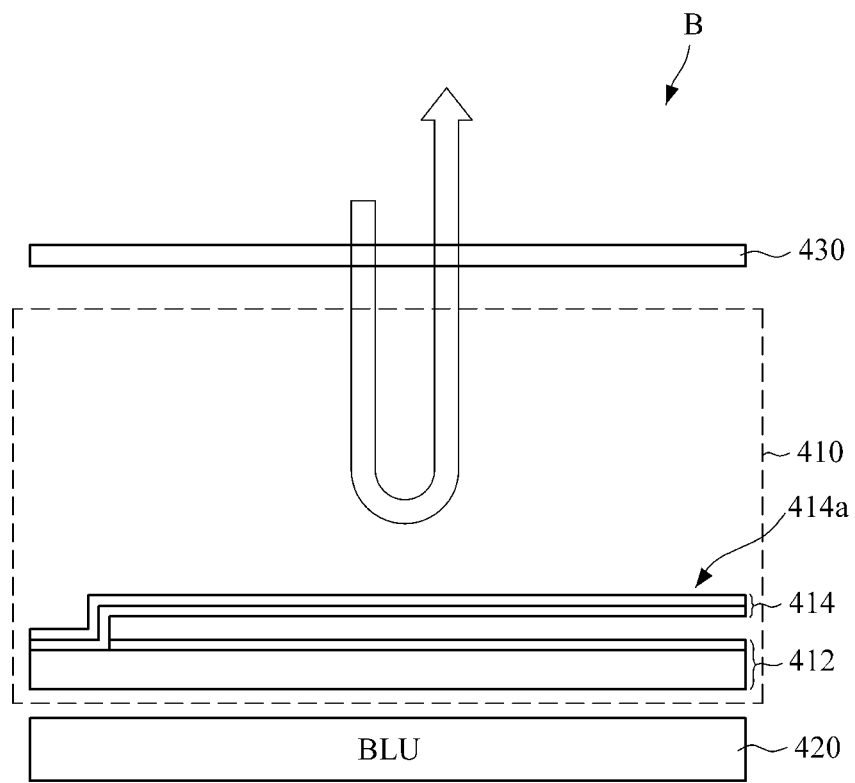
FIGS. 7A and 7B are cross-sectional views illustrating an exemplary embodiment of a reflection-transmission combination type display when the reflection-transmission combination type display operates in a reflection mode.
Figure 7B:
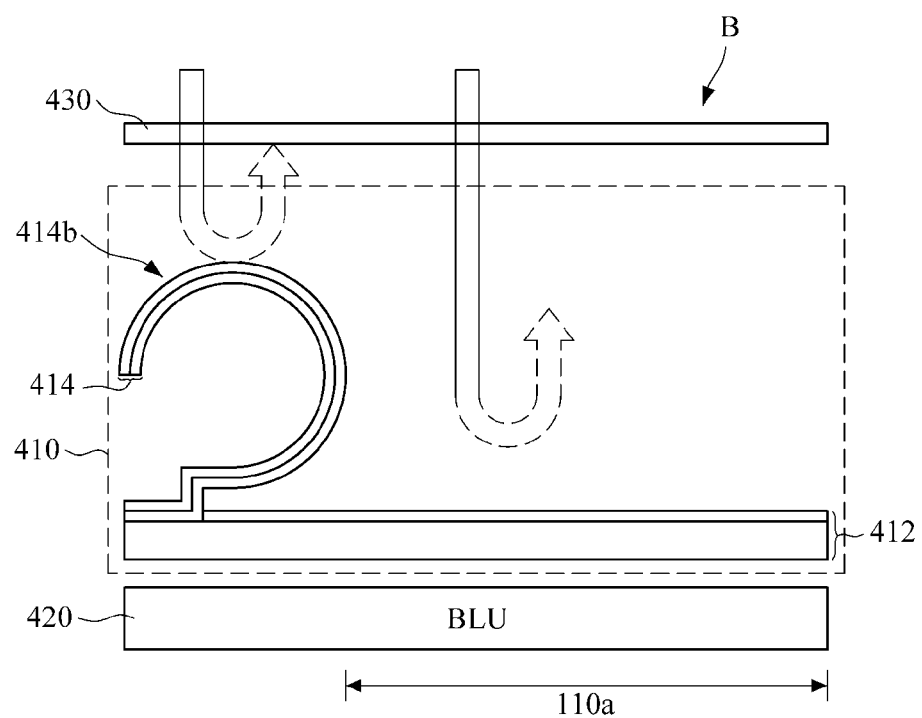

FIGS. 1 and 2A are perspective views illustrating an exemplary embodiment of a light screening apparatus 100, and FIG. 2B is a side view of the light screening apparatus 100 illustrated in FIG. 2A. Referring to FIGS. 1, 2A, and 2B, the light screening apparatus 100 includes a base plate 110, a rollup blade 120, and a driving unit 130. In FIGS. 2A and 2B, the driving unit 130 is illustrated as a simplified box in order to focus on other features of the light screening apparatus 100. The light screening apparatus 100 may function as an optical shutter by itself (as shown in FIGS. 7A and 7B), or may be a part of an optical shutter module (as shown in FIGS. 5A and 5B). FIG. 1 shows a state in which the light screening apparatus 100 is driven to screen light. For better understanding, the rollup blade 120 is illustrated as being separate from the base plate 110 in FIG. 1. In FIGS. 2A and 2B, the light screening apparatus 100 is under a light transmit state.

According to an exemplary embodiment shown in FIGS. 1, 2A and 2B, the base plate 110 has a light transmitting portion 110a through which light can be transmitted. The light transmitting portion 110a may be transparent or translucent. The light transmitting portion 110a is an area through which light passes when the rollup blade 120 is in a rolled-up (i.e. open) position as illustrated in FIG. 2A. As an example, when the light screening apparatus 100 functions as an optical shutter of an imaging device, the light transmitting portion 110a may be located on an optical path of the imaging device so that light transmitted through the light transmitting portion 110a may reach an image sensor after passing through an optical lens. On the other hand, when the rollup blade 120 is driven to be flattened as shown in FIG. 1, the entirety or a part of the light transmitting portion 110a may be blocked by the flattened rollup blade 120 and thus no light, or only a portion of incident light may be transmitted through the light transmitting portion 110a. Since the entirety or a part of the light transmitting portion 110a can be blocked by the rollup blade 120, the amount of light passing through the light transmitting portion 110a may be adjusted with the rollup blade 120. The remaining portion of the base plate 110 except for the light transmitting portion 110a may be optically transparent or opaque.

Referring to FIG. 1, the base plate 110 may have flat shape, but the shape of the base plate 110 is not limited to a flat shape and it may be in an arbitrary shape (for example, a curved shape, a banded shape, a wavy shape, or the like) when it is desired or necessary for an application. In addition, the shape of the light transmitting portion 110a is also not limited, and the light transmitting portion may have a quadrangular shape, a circular shape, an oval shape, a polygonal shape, or the like. The base plate 110 includes a substrate 112 and a lower electrode 114. The substrate 112 may be formed of a transparent or translucent material, or the transparent or translucent material may form only a part of the substrate 112 which includes at least the light transmitting portion 110a. The substrate 112 may be a glass substrate, but is not limited to this. For example, the substrate 112 may be formed of quartz, plastic, silica, or the like.

The lower electrode 114 may be formed of a transparent or translucent material which is electrically conductive. For example, the lower electrode 114 may be formed of Indium Tin Oxide (ITO), ZnO, SnO2, Carbon Nano Tube (CNT) materials, conductive polymers, or the like. The lower electrode 114 is electrically connected to the driving unit 130 and functions as a driving electrode for operating the rollup blade 120 of the light screening apparatus 100.

The lower electrode 114 may be formed on the substrate 112 or embedded into the substrate 112. The lower electrode 114 may be formed to cover the entire area of the light transmitting portion 110a or to cover a part of the light transmitting portion 110a with a predetermined pattern. Generally, when the lower electrode 114 is designed to cover the entire area, the lower electrode 114 is able to generate a stronger force to drive an upper electrode that is the rollup blade 120, as compared to when the lower electrode 114 is designed to cover only a part of the light transmitting portion 110a. The stronger force between the lower 114 and upper 120 electrodes may result in a faster movement (or response time) of the rollup blade 120 between a rolled-up state and a flattened state. However, the lower electrode 114 in exemplary embodiments is not limited to the fully covering configuration. The lower electrode 114 may be formed to cover only a part of the light transmitting portion 110a or to cover the light transmitting portion 110a and a peripheral area of the light transmitting portion 110a.

The rollup blade 120 is maintained in a rolled-up state with a predetermined curvature when there is no driving force applied between the rollup blade 120 and the base plate 110 (see FIGS. 2A and 2B). When the rollup blade 120 is in the rolled-up state, at least the light transmitting portion 110a of the base plate 110 is exposed so that incident light may be transmitted through the light transmitting portion 110a. On the other hand, when a predetermined driving force is applied between the rollup blade 120 and the base plate 110 by the driving unit 130, the rollup blade 120 is flattened (see FIG. 1). When the rollup blade 120 is in the flattened state, the light transmitting portion 110 of the base plate 110 is covered by the rollup blade 120 to block incident light. The driving unit 130 may control the force between the base plate 110 and the rollup blade 120 to put the rollup blade 120 into a state between the flattened state (FIG. 1) and the rolled-up state (FIGS. 2A and 2B), in which the rollup blade 120 partially blocks incident light.

According to exemplary embodiments, the rollup blade 120 may include at least one material layer that prevents light transmission in order to block the incident light. The light screening apparatus 100 may include a single rollup blade 120, as shown in FIGS. 1, 2A and 2b, whose size is large enough to cover the entire area of the light transmitting portion 110a, or may include a plurality of small rollup blades that cover the light transmitting portion 110a by dividing it into plural regions as shown in FIGS. 5A and 5B.

The rollup blade 120 may include a fixed portion 120a and a moving portion 120b. Referring to FIG. 2A, the fixed portion 120a of the rollup blade 120 may be fixed to an edge portion of the base plate 110 where the edge portion is placed outside of the light transmitting portion 110a. It may be possible to fix the fixed portion 120a at another area of the base plate 110 or on a structure (not shown) disposed above the base plate 110. The moving portion 120b includes the remaining portion of the rollup blade 120 other than the fixed portion 120a, and the moving portion 120b may be flattened or rolled up according to the control of the driving unit 130. When a driving voltage applied by the driving unit 130 forms opposite electrical potentials on the base plate 110 (e.g. negative) and on the rollup blade 120 (e.g. positive), an attractive force may be formed between the base plate 110 and the rollup blade 120. Due to the presence of the attractive force, the moving portion 120b may change from the rolled-up state to the flattened state and cover the light transmitting portion 110a. When the driving unit 130 stops supplying the driving voltage, the moving portion 120b may return to the rolled-up state because the attractive force between the base plate 110 and the rollup blade 120 no longer exists.

According to exemplary embodiments, the rollup blade 120 may include at least two layers having different optical properties. The layers having different optical properties may be arranged to correspond to each other (see FIG. 3A) or may be arranged side by side (not shown). Obtaining different optical properties may not be limited to using different materials whose optical properties are different from each other. For example, different optical properties may be obtained from the same material by applying different surface finishes to different surfaces or by patterning surfaces with optically different patterns.

One of the surfaces of the rollup blade 120 may be an anti-reflection surface. For example, the rollup blade 120 has an outer circumferential surface 122a and an inner circumferential surface 124a in the rolled-up state as illustrated in FIGS. 2A and 2B. The outer circumferential surface 122a may be an anti-reflection surface in order to prevent light reflection from the outer circumferential surface 122a. The anti-reflection surface may be a structure that minimizes light reflection from its surface. As an anti-reflection surface, the outer circumferential surface 122a of the rollup blade 120 may have a black color and look like an optical black surface.

Providing a low surface reflectance is one way of forming an anti-reflection surface. However, the low surface reflectance alone may not be sufficient for forming an anti-reflection surface for certain applications, because a material layer with a low surface reflectance may have a high light transmittance and a high internal reflectivity. In this case, a considerable amount of light may be internally reflected and returned back to the surface, so the material layer may not function as an anti-reflection surface even though it has a low surface reflectance. For example, an anti-reflection coating (ARC) may be applied on the outer circumferential surface 122a of the rollup blade 120 to form an anti-reflection surface by reducing surface reflectance with a relatively high light transmittance. The rollup blade 120 includes the upper electrode layer 124 formed of a metal on an opposite side of the ARC. The upper electrode layer 124 may be chrome. The upper electrode layer 124 both absorbs and reflects light. Due to the reflection properties of the upper electrode layer 124, a considerable amount of incident light transmitted through the ARC may experience internal reflection on a surface of the upper metal electrode layer 124 and may then return back to the outer circumferential surface 122a and be emitted from the rollup blade. Accordingly, applying an anti-reflection coating (ARC) on the outer circumferential surface 122a alone may not be sufficient to minimize the amount of reflected light, and thus the outer circumferential surface 122a may not function sufficiently as an anti-reflection surface.

When the outer circumferential surface 122a of the rollup blade 120 is not an anti-reflection surface, a substantial amount of incident light may be reflected by the outer circumferential surface 122a in the rolled-up state. A portion of the reflected light may be reflected toward the external environment, but another portion of the reflected light may be reflected toward the light transmitting portion 110a. Most of the light reflected by a side surface of the outer circumferential surface 122a may be directed to the light transmitting portion 110a, because the side surface is substantially perpendicular to the light transmitting portion 110a (as shown in FIG. 2B). The light reflected toward the light transmitting portion 110a is very undesirable. For example, when the light screening apparatus 110 is used as an optical shutter of an imaging device, the light reflected toward the light transmitting portion may get to an image sensor and create an undesired ghost image on a photographic image.

The rollup blade 120 may be placed far enough from the light transmitting portion 110a in order to prevent formation of an undesired ghost image. However, this may increase response time of the rollup blade 120 and thus reduce a switching speed of the rollup blade 120 between the rolled-up state and the flattened state.

According to exemplary embodiments, the formation of undesired ghost images is suppressed without deteriorating a response speed and time of the rollup blade 120 by forming the outer circumferential surface 122a as an anti-reflection surface.

As described above, ERS systems have a problem with image dragging effects. In contrast to an ERS system, according exemplary embodiments a mechanical shutter system is used in which all image sensors in the pixel matrix are activated simultaneously. Thus, there is no image dragging problem.

Figure 3A:
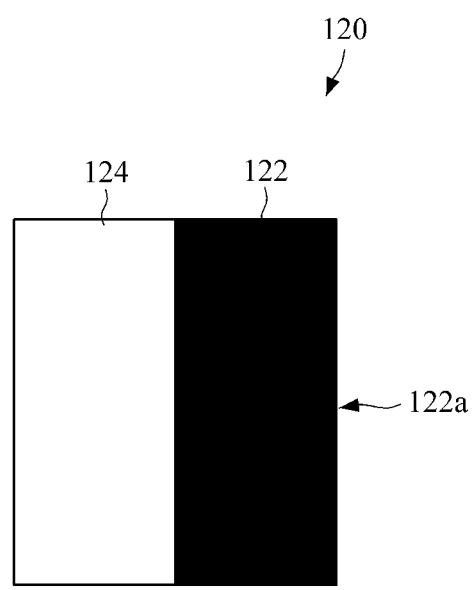
FIG. 3A is an enlarged view of a part marked by dotted lines in FIG. 2B in according to an exemplary embodiment of a rollup blade.
Figure 3B:
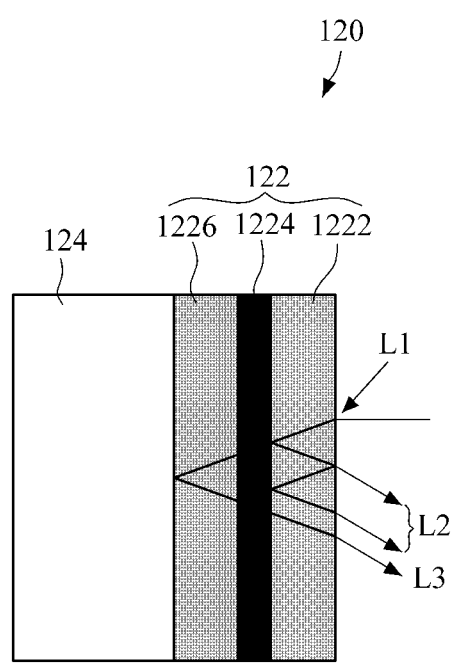
FIG. 3B is an enlarged view of the part marked by dotted lines in FIG. 2B according to another exemplary embodiment of the rollup blade.

One method of forming a surface of the rollup blade 120 as an anti-reflection surface is to form an optical black layer 122 on a surface of the rollup blade 120. The optical black layer 122 is a material layer that absorbs most incident light without any substantial surface reflection on a surface or internal reflection inside of the material layer. Referring to FIGS. 3A and 3B, the rollup blade 120 may include an optical black layer 122 as a single material, and the upper electrode layer 124 disposed on the optical black layer 122. The optical black layer 122 may have a single-layered structure formed of a single material (see FIG. 3A) or a multi-layered structure formed of the same material with interfaces or formed of different materials (see FIG. 3B).

According to an exemplary embodiment shown in FIG. 3A, a major portion of light incident to the optical black layer 122 of the rollup blade 120 may be transmitted into the rollup blade 120 without being substantially reflected by a surface of the optical black layer 122. A major part of light transmitted into the rollup blade 120 may be absorbed in the optical black layer 122 and eliminated while proceeding through the optical black layer 122. The optical black layer 122 may absorb and eliminate light internally reflected, if there is any, by the upper electrode layer 124 as well. Thus, in addition to preventing the reflection of ambient light, the optical black layer 122 can also prevent light reflected from the upper electrode 124 from being further reflected. Accordingly, the rollup blade 120 includes the anti-reflection surface 122a which is a surface of the optical black layer 122 and located opposite to the upper electrode layer 124 on the rollup blade 120.

According to another exemplary embodiment as shown in FIG. 3B, the rollup blade 120 may have a multi-layered structure including a light absorbing layer to form an anti-reflection surface where the light absorbing layer is capable of weakening the intensity of light (e.g. visible light). The light passing through a surface of the multi-layered structure without experiencing surface reflection may be weakened when it passes through the light absorbing layer. The weakened light may proceed within the multilayered structure and may be internally reflected by the upper electrode layer 124 of the rollup blade 120. After being reflected, the weakened light may be further weakened when it passes through the light absorbing layer again. Accordingly, the multi-layered structure having a light absorbing layer may function as an absorptive anti-reflection structure for the rollup blade 120. In addition, light incident on a multi-layered structure having more than three layers may be reflected at various surfaces (i.e. top surface and/or internal surfaces between layers). The light reflected by different surfaces may experience destructive interference and thus may further minimize the amount of light reflected by the anti-reflection surface (i.e. the outer circumferential surface) of the rollup blade 120.

According to exemplary embodiments, the rollup blade 120 has an inner circumferential surface 124a which is disposed opposite the outer circumferential surface 122a. When the rollup blade 120 is in the rolled-up state, the inner circumferential surface 124a may face away from the ambient light (from an external light source) as shown in FIGS. 2A and 2B. On the other hand, the inner circumferential surface 124a may face the ambient light, as shown in FIG. 1, when the rollup blade 120 is in the flattened state. The inner circumferential surface 124a may be a reflection surface. Therefore, the rollup blade 120 have different optical characteristics (i.e. anti-reflectivity and reflectivity) on the surfaces disposed on opposite sides of the rollup blade 120 (i.e. the outer circumferential surface 122a and the inner circumferential surface 124a). The different optical characteristics may be formed on one side of the rollup blade 120 (for example, the outer circumferential surface 122a). Forming the reflection surface on the rollup blade 120 may be more desirable in certain screening apparatus applications. For example, the reflection surface of the rollup blade may be more desired in an electronic device, such as a reflection-transmission combination type display, which utilizes the light reflected by the reflection surface when the rollup blade is in the flattened state (as shown in FIG. 1) blocking the light transmission portion of the device. Devices using the light reflected by the reflection surface will be further described later.

The term "reflection surface" may indicate a surface having a high reflectance, or a multi-layered structure having high surface reflectance and also high internal reflectance with respect to the light transmitted through the reflection surface. Accordingly, when the rollup blade 120 includes a reflection surface as the inner circumferential surface 124a, the inner circumferential surface 124a may have a high surface reflectance and the inner circumferential surface 124a may also comprise one or more materials and/or include a structure which maximizes the amount of transmitted light which is internally reflected and emitted from the inner circumferential surface 124a.

FIGS. 3A and 3B illustrate exemplary structures of the rollup blade 120, and are enlarged views of a part marked by dotted lines in FIG. 2B. Referring to FIG. 2B, the rollup blade 120 is rolled into left side and the right side indicated by a number 122a (see also, FIGS. 3A and 3B). As shown in FIGS. 3A and 3B, the rollup blade 120 may include an optical black layer 122 that faces the base plate 110, and an upper electrode layer 124 formed on the optical black layer 122.

Referring to FIG. 3A, the optical black layer 122 may be a single material layer and have at least one anti-reflection surface (e.g. a right surface in FIG. 3A). The optical black layer 122 may be formed of a conductive material or an electrically insulating material, such as a dielectric or polymer, whose optical characteristics are sufficient to form an anti-reflection surface. When the optical black layer 122 is formed of a conductive material, an insulating layer may be additionally formed underneath the conductive optical black layer and/or on top of the base plate 110.

According to exemplary embodiments, the optical black layer 122 may be formed of a material having a low surface reflectance and a relatively high extinction coefficient in which a large amount of incident light is absorbed. Generally, a portion of light incident on a medium is reflected by the surface of the medium, and the remaining portion of the light is transmitted into the medium. A portion of the transmitted light which is proportional to the extinction coefficient of the medium is absorbed into the medium, and only the remaining portion of the transmitted light is emitted from the medium. Having a relatively high extinction coefficient alone is not sufficient to maximize the amount of light absorbed by the medium, because there would be only a very small amount of light transmitted into the medium when the medium has a high surface reflectance. Therefore, a desired material for the optical black layer 122 generally has both a high extinction coefficient and a low surface reflectance. For example, Al or Ag may not be a suitable material for the optical black layer 122 even though each of them has a relatively high extinction coefficient which is higher than that of Cr or Mo, because Al and Ag have considerably high surface reflectances.

A light incident surface of the optical black layer 122 (i.e. the right-side surface 122a in FIGS. 3A) may be roughened to lower the surface reflectance. The light incident surface of the optical black layer 122 may be roughened by various methods. As an example, minute protrusions such as embossing may be formed on the surface of the optical black layer 122. In addition, other methods for reducing the surface reflectance with regular and irregular patterns may be applied to the light incident surface of the optical black layer 122.

According to exemplary embodiments, the upper electrode layer 124 may be formed of an opaque metal, such as Cr, Al, Au, Mo, Cu, or the like, or a combination thereof. In addition, the upper electrode layer 124 may be formed of an opaque, conductive polymer. The optical properties of the material and the thickness of the upper electrode layer 124 effect the intensity and amount of light reflected by the upper electrode layer 124 and directed to the surface of the optical black layer 122. Therefore, the performance of the optical black layer 122 may be improved when an optimal material having an optimal thickness is selected for the upper electrode layer 124, and then most of the transmitted light passing through the optical black layer 122 may be eliminated by absorption within the layer and/or by destructive interference of the reflected light which includes light reflected by the upper electrode layer 124.

According to exemplary embodiments, the optical black layer 122 and upper electrode layer 124 of the rollup blade 120 may have different residual stresses. In more detail, the upper electrode layer 124 may have tensile residual stress, and the optical black layer 122 may have compressive residual stress, no residual stress, or tensile residual stress which is less than the tensile residual stress in the upper electrode layer 124. Because of this residual stress difference (i.e. there is more tensile residual stress in the upper electrode layer 124), the rollup blade 120 may be maintained in a rolled-up state (see FIGS. 2A and 2B) when there is no driving voltage. The curvature of the moving portion 120*b* in the rolled-up state may be determined by controlling the residual stress difference between the upper electrode layer 124 and the optical back layer 122.

When a driving voltage is applied by the driving unit 130, a predetermined driving force (e.g. an attractive force) may be generated between the lower electrode 114 and the rollup blade 120 (in more detail, the upper electrode layer 124). With an attractive driving force, the moving portion 120*b* of the rollup blade 120 is attracted to the lower electrode, is flattened, and covers the light transmitting portion 110 of the base plate 110 (see FIG. 1). The driving force may be an electro-static force generated between the lower electrode 112 and the upper electrode layer 124. Other types of driving forces may be employed separately or together to operate the rollup blade 120. For example, when the upper electrode layer 124 includes a piezoelectric layer, both a piezoelectric driving force on the upper electrode layer 124 and an electro-static force between the upper and lower electrode may be applied together to drive the moving portion 120*b* of the rollup blade 120.

Referring to FIG. 3B, the optical black layer 122 may be a multi-layered structure which may includes a plurality of material layers stacked together. The plurality of material layers may include three or more layers. For example, the optical black layer 122 may include a first phase compensation layer 1222 that faces the base plate 110, a light absorption layer 1224 formed on the first phase compensation layer 1222, and a second phase compensation layer 1226 formed on the light absorption layer 1224. The light absorption layer 1224 may be made of a material such as chrome which can both absorb and reflect light. The absorption properties of the light absorption layer 1224, in combination with the other layers of the optical black layer, enable the optical black layer to achieve reflection reduction over a wide wavelength range.

The first phase compensation layer 1222 may be formed of an electrically nonconductive material since it may contact the lower electrode 114 (see FIG. 1) of the base plate 110. The first phase compensation layer 1222 may function to prevent initial reflection of ambient light L1 incident on the first phase compensation layer 1222 and direct the incident light to the light absorption layer 1224 as illustrated in FIG. 3B. For preventing initial reflection of the incident light, the first phase compensation layer 1222 may be formed of a material which has a refractive index greater than that of the air and less than that of the light absorption layer 1224. Since the first phase compensation layer 1222 has an intermediate refractive index, the incident light may experience a relatively smooth transition from the air to the light absorption layer 1224. For example, when a metal material, such as Cr or Mo, is used for the light absorption layer 1224, the first phase compensation layer 1222 may be formed of a dielectric material such as silicon oxide. The first phase compensation layer 1222 may be a single layer or a multi-layered structure consisting of two or more layers. The multi-layered structure may be formed of layers of the same material or of different kinds of materials.

The first phase compensation layer 1222 may function to adjust the phase of light passing therethrough. For example, when the first phase compensation layer 1222 is of with silicon oxide, the thickness of the first phase compensation layer 1222 may be selected to cause destructive interference between light L2 reflected by the light absorption layer 1224 and light L3 reflected by the upper electrode layer 124. Referring to FIG. 3B, the light L3 passes through the first phase compensation layer 1222 and the second phase compensation layer 1226. Therefore, both thickness of the first compensation layer 1222 and thickness of the second phase compensation layer 1226 may be selected to adjust the phase of the light L3 to cause the destructive interference between lights L2 and L3.

According to exemplary embodiments, the light absorption layer 1224 may absorb light and weaken the intensity of the light. The light absorption layer 1224 may be formed of a translucent metal material having a great absorption coefficient, such as Cr, Mo, or a combination thereof. In addition, the light absorption layer 1224 may be formed of dielectric material or polymer which has a relatively high absorption coefficient. The intensity of light L1 incident to the rollup blade 120 may be reduced when the light L1 passes through the light absorption layer 1224. When a thin film is applied on the surface of the upper electrode 124 to cause destructive interference, it may be difficult to achieve reflection reduction through destructive interference over the entire wavelength range of visible light. However, when the light absorption layer 1224 is used according to the exemplary embodiment shown in FIG. 3B, it may be possible to achieve reflection reduction over a wide wavelength range by also weakening the intensity of the light passing through the light absorption layer 1224. The light absorption layer 1224 may be a single layer or a multi-layered structure consisting of two or more layers formed of the same material or different kinds of materials.

The second phase compensation layer 1226 may be formed of an electrically nonconductive material to provide electrical isolation between the light absorption layer 1224 and the upper electrode layer 124. The second phase compensation layer 1226 may function to adjust the phase of light passing therethrough, which is similar to the first phase compensation layer 1222. Accordingly, the second phase compensation layer 1226 and the first phase compensation layer may be formed of the same material, such as silicon oxide or other dielectric materials. The thickness of the second phase compensation layer 1225 may be adjusted with or without adjusting the thickness of the first phase compensation layer 1222, in order to cause the destructive interference between light L2 reflected from the light absorption layer 1224 and light L3 reflected from the upper electrode layer 124. The second phase compensation layer 1226 may be a single layer or a multi-layered structure consisting of two or more layers formed of the same material or different kinds of materials.

According to exemplary embodiments, the upper electrode layer 124 may be a translucent metal layer formed of Cr, Al, Au, Mo, Cu, or a combination thereof, or the upper electrode layer 124 may be formed of an opaque and conductive polymer. The conductive polymer may be non-opaque, since a non-opaque polymer can be converted to an opaque polymer by using various techniques including coloring, painting, etc. The upper electrode layer 124 may act as a reflector for reflecting light back to the optical black layer 122 to enhance the destructive interference between light L3 and light L2, and thereby minimize the amount of light reflected by the outer circumference surface of the rollup blade 120.

The residual stresses in the first phase compensation layer 1222, the light absorption layer 1224, the second phase compensation layer 1226, and the upper electrode layer 124 of the rollup blade 120 may be different so that the moving portion 120b may be maintained in the rolled-up state (see FIG. 2A) when there is no driving voltage applied by the driving unit 130. In more detail, the residual stresses in the first phase compensation layer 1222, the light absorption layer 1224, the second phase compensation layer 1226, and the upper electrode layer 124 may be sequentially increased in the direction from the first phase compensation layer 1222 to the upper electrode layer 124. Alternatively, the first phase compensation layer 1222 may have compressive residual stress, and the upper electrode layer 124 may have tensile residual stress. Each of the light absorption layer 1224 and the second phase compensation layer 1226, which are disposed between those two layers 1222 and 124, may have either compressive residual stress or tensile residual stress. But the level of the (either compressive or tensile) residual stress in each of the light absorption layer 1224 and the second phase compensation layer 1226 may be smaller than the compressive residual stress of the first phase compensation layer 1222 or the tensile residual stress of the upper electrode layer 124 respectively.

The curvature of the moving portion 120b in the rolled-up state (see FIGS. 2A and 2B) may be controlled by varying the residual stresses in the first phase compensation layer 1222, the light absorption layer 1224, the second phase compensation layer 1226, and/or the upper electrode layer 124 of the rollup blade 120. When a predetermined driving voltage is applied by the driving unit 130, a predetermined driving force (for example, an attractive force) may be generated between the lower electrode 114 and the upper electrode layer 124 of the rollup blade 120. Due to the presence of the driving force, the moving portion 120b of the rollup blade 120 may be flattened to cover the light transmitting portion 110a of the base plate 110. The driving force formed between the lower electrode 112 and the upper electrode layer 124 may be an electro-static force.

Figure 4:
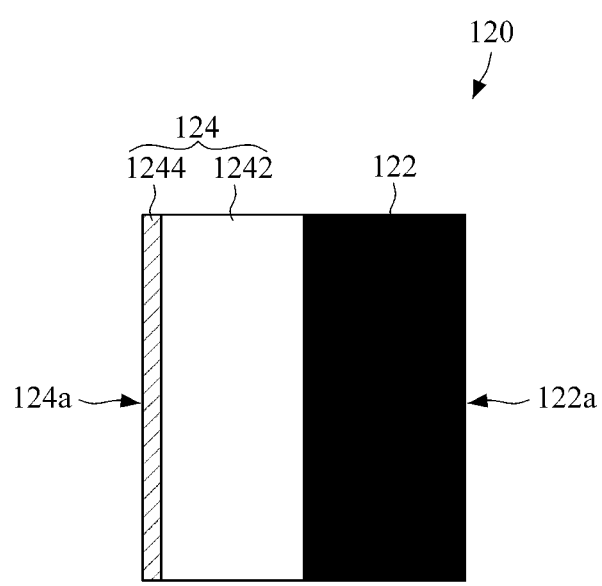
FIG. 4 is an enlarged view of the part marked by dotted lines in FIG. 2B according to another exemplary embodiment of the rollup blade.

According to exemplary embodiments, at least one surface (e.g. the left surface) of the upper electrode layer 124 illustrated in FIGS. 3A and 3B may be a reflection surface. The reflection surface on the upper electrode layer 124 may be obtained by forming the upper electrode layer 124 with a conductive material having a high surface reflectivity, or by forming the upper electrode of a conductive layer 1242 and a light reflection layer 1244 formed on a surface of the conductive layer 1242 opposite to the optical black layer 122 as shown in FIG. 4. In this case, the outer surface of the light reflection layer 1244 becomes a reflection surface. As previously addressed, a light screening apparatus having the light reflection layer 1244 on the upper electrode layer 124 may be employed in a reflection-transmission combination type display.

According to the exemplary embodiments shown in FIGS. 1, 2A, and 2B, the driving unit 130 is electrically connected to the lower electrode 114 of the base plate 110 and the upper electrode 124 of the rollup blade 120. The moving portion 120b of the rollup blade 120 may flattened when the driving unit 130 applies a driving voltage with opposite potentials (i.e. negative and positive potentials) to the lower electrode 114 and the upper electrode layer 124, respectively.

A test result shows that the outer circumference surface 122a of the rollup blade 120 has very low reflectance with respect to visible light. In a test with a conventional rollup blade having a lower insulating layer (e.g. a thickness of about 300 nm) formed of silicon nitride and an upper electrode layer (e.g. a thickness of about 500 nm) formed of aluminum (Al), the conventional rollup blade shows reflectance of about 60 to 90% in all incident angles for the entire visible wavelength range. On the other hand, the rollup blade 120 of the exemplary embodiment shown in FIG. 3B showed reflectance of about 20% or less in all incident angles for the entire visible wavelength range in the same test environment. More specifically, the rollup blade 120 according to exemplary embodiments has an absorptive-type reflection preventing structure as illustrated in FIG. 3B, and includes the first phase compensation layer 1222 (e.g. a thickness of 90 nm) formed of silicon oxide, the light absorption layer 1224 (e.g. a thickness of 7 nm) formed of Cr, the second phase compensation layer 1226 (e.g. a thickness of 90 nm) formed of silicon oxide, and the upper electrode layer 124 (e.g. a thickness of 60 nm) formed of Cr. In this multi-layered structure, a low reflectance over the entire visible light frequency range may be possible due to the combination of the intensity reduction caused by the light absorption layer 1224 and the destructive interference caused by the first and second phase compensation layers 1222 and 1226. The intensity reduction in the light absorption layer 1224 may be significant when the light absorption layer 1224 is formed a thin metal (e.g. Cr) which has a relatively high absorption coefficient. Most of the incident light may be transmitted through the first phase compensation layer 1222, to be incident on the light absorption layer 1224. The portion of light reflected by the surface of the light absorption layer 1224 contributes to the destructive interference. The remaining portion of the incident light is transmitted through the light absorption layer 1224 and experiences a significant intensity reduction. Thus, a relatively small amount of the originally incident light not absorbed by the thin metal layer 1224 and reaches the upper electrode layer 124 after passing through the second phase compensation layer 1226. This small amount of light is further reflected and absorbed by the upper electrode layer 124 which may be formed of the same material (e.g. Cr) as the light absorption layer 1224, but have a thickness much larger than that of the light absorption layer 1224. The incident light reflected by the upper electrode 124 may be transmitted through the second phase compensation layer 1226 and experience further significant reduction of the intensity due to the absorption in the light absorption layer 1224. The light intensity reduction may occur over the entire visible light frequency range when the incident light passes through the light absorption layer 1224 made of a thin metal (e.g. Cr). Alternatively, the destructive interference may be limited to the middle of the visible light frequency range by adjusting the thickness of the phase compensation layers 1222 and 1226 such that the combination of the intensity reduction by the absorption layer and the destructive interference by the phase compensation layers may reduce the reflectance. According to exemplary aspects described herein, the same metal material (e.g. Cr) having a relatively large absorption coefficient is used for the upper electrode and the light absorption layer to provide the low reflectance. However, different materials may be used for the light absorption layer and the upper electrode.

Figure 3C:
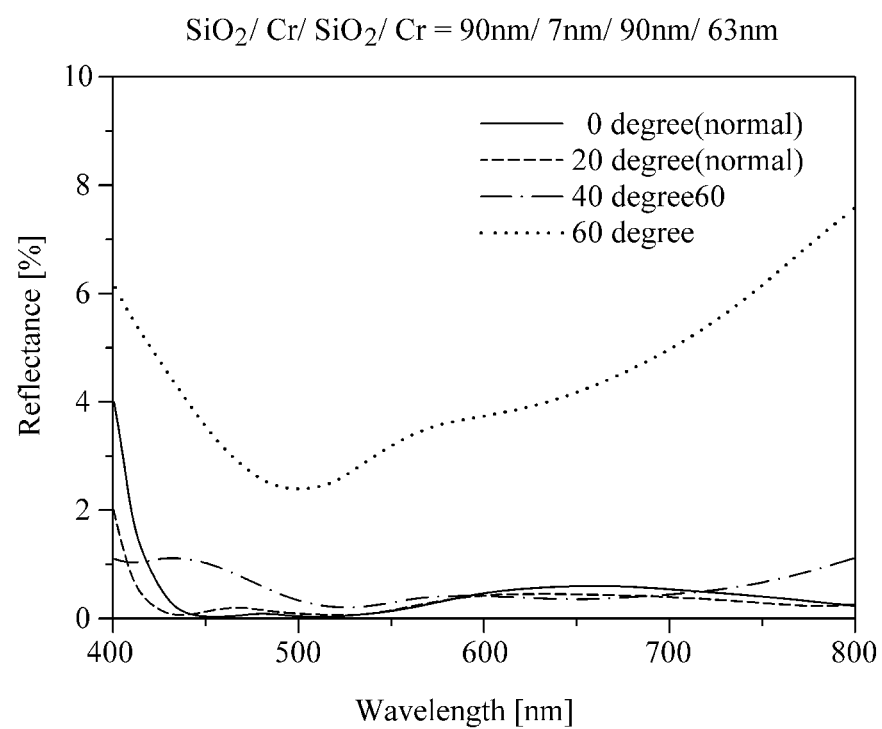
FIG. 3C is a graph illustrating a resultant reflectance of a rollup blade including a first phase compensation layer, a light absorption layer, a second phase compensation layer, and an upper electrode according to an exemplary embodiment.

According to one aspect of the exemplary embodiment shown in FIG. 3B, the rollup blade 120 may include the first phase compensation layer made of $SiO_2$, the light absorption layer 1224 made of Cr, the second phase compensation layer 1226 made of $SiO_2$, and the upper electrode 124 made of Cr. The thickness of the light absorption layer may be from approximately 5 nm to approximately 50 nm, or may be from approximately 5 nm to approximately 15 nm. According to one example, when the light absorption layer is selected to have a thickness of 7 nm, the phase compensation layers may each have a thickness of 90 nm, and the upper electrode may have a thickness of 63 nm. A resultant reflectance of the roll-up blade is shown in the graph of FIG. 3C.

FIGS. 5A and 5B are perspective views illustrating another exemplary embodiment of a light screening apparatus 200. FIG. 5A shows a state in which the light screening apparatus 200 blocks light, and FIG. 5B shows another state when the light screening apparatus 200 allows light transmission through a portion 210a. The light screening apparatus 200 illustrated in FIGS. 5A and 5B may be used as a mechanically operating optical shutter for an imaging device such as a digital camera.

The light screening apparatus 200 includes a plurality of rollup blades 220. Fixing portions of the rollup blades 220 are fixed along an edge portion of a circular shaped light transmitting portion 210a of a base plate 210. A moving portion of each rollup blade 220 is radially arranged from the center of the light transmitting portion 210a of a base plate 210 as shown in FIG. 5A. The entire light transmitting portion 210a is covered by the plurality of rollup blades 220, where the moving portion of each rollup blade 220 covers one of a plurality of radially divided areas of the light transmitting portion 210a. As shown in FIGS. 5A and 5B, each rollup blade may be substantially wedge-shaped, and the rollup blades may be arranged in a circle to provide a substantially circular aperture when in the rolled-up state. Alternately, the rollup blades may have other shapes and/or may provide apertures of different shapes so long as they are capable of providing synchronized, simultaneous operation.

The rollup blades may be designed to provide a specific relationship between the aperture formed by the rollup blades in the rolled-up state and an image sensor, display, or other optics disposed therebelow. When the rollup blades are provided in an arrangement as shown in FIGS. 5A and 5B, the diameter L' of a substantially circular aperture formed by the rollup blades when in the rolled-up state may be defined as $$L' = \frac{3}{2}\pi r,$$

where r is a radius of the curve formed by each of the rolled-up blades. According to an example in which the light screening apparatus is used as an optical shutter of a display apparatus, a relationship between the diameter L' of the substantially circular aperture and a diameter L of a display region may be defined as L'=L−2r, or in another form as $$\frac{L'}{L} = \left(1 - \frac{4}{3\pi}\right).$$

According to this example, when the light screening apparatus is used as an optical shutter of a display apparatus a ratio $$\frac{L'}{L}$$

may be greater than 0 and less than or equal to 80%. More specifically, the ratio $$\frac{L'}{L}$$

may be greater than 0 and less than or equal to 55%. According to one aspect, the ratio $$\frac{L'}{L}$$

may be 58%. According to an example in which the light screening apparatus is used as an optical shutter of an imaging device, such as a camera, a ratio between a diameter L' of the aperture and a diameter L of a light receiving region disposed therebelow may satisfy:

$$100\% \leq \frac{L'}{L} \leq 220\%,$$

or more specifically:

$$100\% \leq \frac{L'}{L} \leq 160\%.$$

Figure 5C:
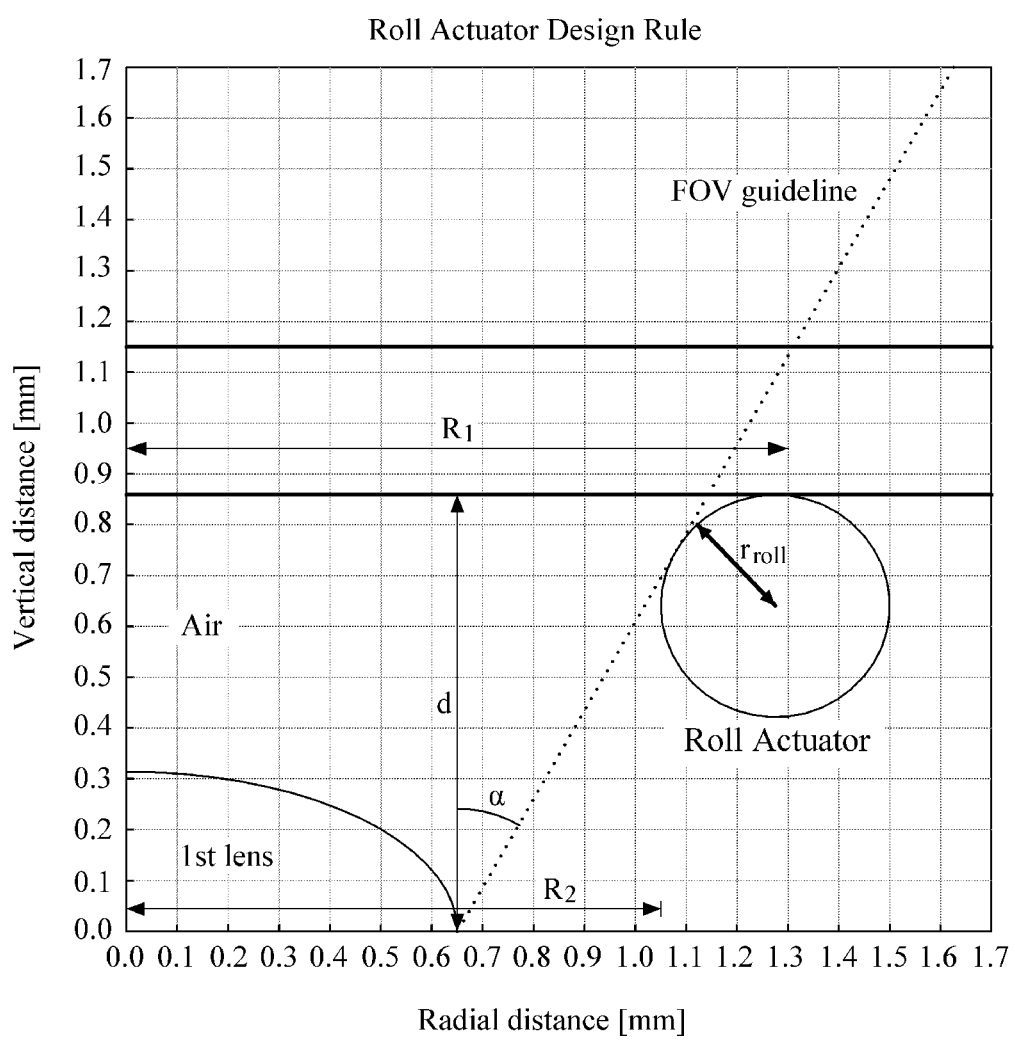
FIG. 5C is a chart illustrating an exemplary relationship between an aperture provided by an optical shutter, a size of an optical element disposed below the optical shutter, and a vertical distance between a plane of the optical element and a cover glass, according to an exemplary embodiment.

FIG. 5C illustrates an exemplary relationship between an aperture provided by the optical shutter, a size of a lens or other optical element disposed below the optical shutter, and a vertical distance between a plane of the lens or other optical element and a cover glass. FIG. 5C provides exemplary dimensions. In the example illustrated in FIG. 5C, FOV is the field of view, $r_{roll}$ is the radius of the rollup blade in the rolled-up state, $r_{os}$ is the radius of the optical stop of the optical system disposed below the optical shutter, $R_1$ is the radius of the aperture formed on the cover glass, $R_2$ is the radius of the aperture formed by the rollup blades in the rollup state, d is the distance between the cover glass and a plane of the first lens or optical element, and α is an angle of the field of view, such that $R=2\pi r_{roll}$, and $R=2\pi (r_{os}+d\tan\alpha)/(2\pi-\tan\alpha)$. It is seen from FIG. 5C that $R_1$ is 1.28 mm, $R_2$ is 1.058 mm and $r_{roll}$ is 0.222 mm in conditions that the radius of the first lens is 0.645 mm, α is 30 degrees, and d is 0.88 mm.

The light screening apparatus 100 illustrated in FIGS. 1, 2A, and 2B may be considered to be an enlarged view of one of the rollup blades 220 constructing the light screening apparatus 200 illustrated in FIGS. 5A and 5B. Hereinafter, the light screening apparatus 200 will be described based on differences from the light screening apparatus 100.

According to the embodiment shown in FIGS. 5A and 5B, the light screening apparatus 200 may include the base plate 210 having the light transmitting portion 210a. The light transmitting portion 210a may be in a circular, oval or equilateral polygonal shape. The base plate 210 includes a transparent substrate 212 and a lower electrode 214 (see FIG. 1) formed on the transparent substrate 212.

The light screening apparatus 200 includes the plurality of rollup blades 220. When each of the rollup blades 220 is in the rolled-up state as illustrated in FIG. 5B, an outer circumference surface of each of the rollup blades 220 may be an anti-reflection surface. In order to form the outer circumference surface as an anti-reflection surface, each rollup blade 220 may have an anti-reflection structure including an optical black layer 222. In addition, the upper surface of each rollup blade 220 in the flattened state as illustrated in FIG. 5A may be a reflection surface.

Fixing portions of the rollup blades 220 are arranged on the base plate 210 to form one of various shapes of the light transmitting portion 210a (e.g. a circular, oval or equilateral polygonal shape). When the rollup blades 220 are driven by the driving unit 130, the moving portions of the rollup blades 220 are flattened as shown in FIG. 5A. The moving portion of each of the rollup blades may have a wedge shape (or triangular shape) and a corner of the wedge shape may be substantially aligned at the center of the light transmitting portion 210a with a predetermined angle. The moving portion of each of the rollup blades 220 covers a corresponding one of the divided areas of the light transmitting portion 210. When the rollup blades 220 are flattened, there may be a gap formed between neighboring rollup blades 220, or at least between the moving portions of neighboring rollup blades 220. Alternatively, the fixing portions of neighboring rollup blades 220 may be arranged without any gaps by forming a mechanical coupling between the moving portions of the neighboring rollup blades 220.

According to the exemplary embodiment shown in FIGS. 5A and 5B, the light screening apparatus 200 includes a driving unit (not shown) electrically connected to the base plate 210 and the rollup blades 220. When there is a driving force controlled by the driving unit, the moving portions of the rollup blades 220 may be flattened as shown in FIG. 5A. The driving unit may control the rollup blades 220 simultaneously or individually. In addition, the driving unit may be able to adjust a degree of rolled-up or flattened of the rollup blades 220 to control the size of the opened aperture of the light transmitting portion 210a.

When there is no driving voltage from the driving unit, the moving portions of the rollup blades 220 are maintained in the rolled-up state as illustrated in FIG. 5B due to the presence of residual stress in the rollup blades 220. The moving portion of each rollup blade 220 may include an optical black layer 222 and upper electrode layer 224. The optical black layer may have a single layer structure or a multi-layered structure consisting of three or more layers). The difference between the residual stresses of the optical layer and the upper electrode layer may cause a rollup of the driving portion of each rollup blade 220. The moving portion of each rollup blade 220 is rolled up outward from the center of the light transmitting portion 210a as shown in FIG. 5B in which the light transmitting portion 210a of the base plate 210 is fully exposed to the incident light. When a driving voltage is applied by the driving unit between the base plate and the rollup blades 220, the moving portions of the rollup blades 220 are flattened to cover the light transmitting portion 210a as shown in FIG. 5A, and thereby prevent light passing through the light transmitting portion 210a.

Figure 6:
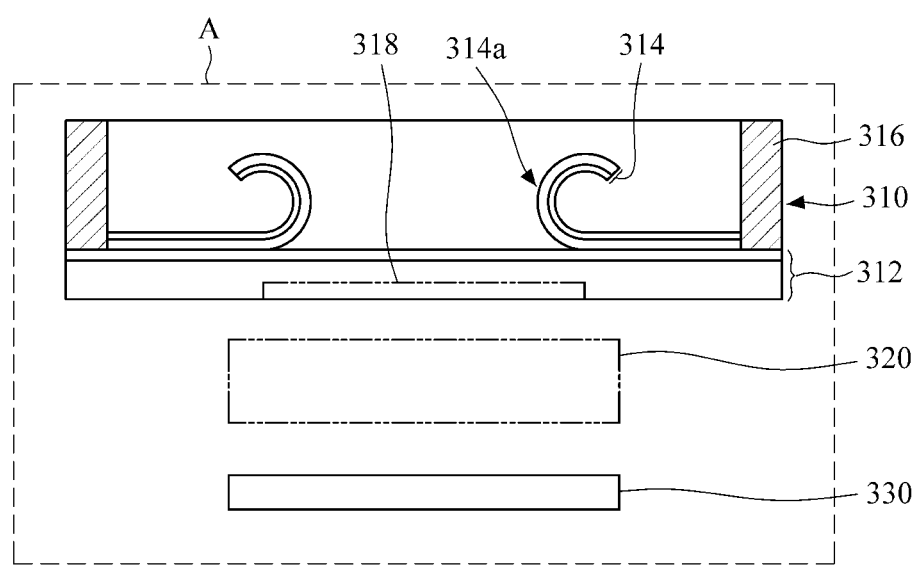
FIG. 6 is a cross-sectional view illustrating an exemplary embodiment of an imaging device including a light screening apparatus.

FIG. 6 is a cross-sectional view illustrating an exemplary embodiment of an imaging device including a light screening apparatus 310. Referring to FIG. 6, the imaging device A includes the light screening apparatus 310, a lens unit 320, and an image sensor 330.

The light screening apparatus 310 may be similar to the light screening apparatus 200 illustrated in FIGS. 5A and 5B or a light screening apparatus according to another exemplary embodiment as described herein. In FIG. 6, for convenience of description, a driving unit of the light screening apparatus 310 is not shown. The driving unit of the light screening apparatus 310 controls the position of rollup blades 314. The rollup blades 314 may be in the rolled-up state, in the flattened state or a state between the rolled-up and flattened states, and thereby fully allow light transmission to the image sensor 330, fully prevent light transmission to the image sensor 330, or partially allow light transmission to the image sensor 330, respectively. In addition, the driving unit of the light screening apparatus 310 may control the amount of time the rollup blades 314 stay at a certain position/state (i.e. in the rolled up state, the flattened state, and/or a state between the rolled-up and the flattened state) to control the amount of light transmitted to the image sensor 310. In the light screening apparatus 310, the outer circumference surface 314a of each rollup blade 314 may be an anti-reflection surface.

According to exemplary embodiments, a spacer frame 316 may be formed on a base plate 312 of the light screening apparatus 310 to protect the rollup blades 314. For example, the spacer frame 316 may be positioned on an edge portion of the base plate 312 which is not covered by the rollup blades 314 as shown in FIG. 6. Alternatively, a transparent cover (not shown) instead of the spacer frame 316 may be placed to on the base plate 312 where the transparent cover is able to cover the entire base plate 312 while providing a sufficient inner space for movement of the rollup blades 134. Other optical components, such as a filter, a lens, etc., which are used to adjust the amount light passing through the light transmitting portion, may be further disposed on or in conjunction with the base plate 312 of the light screening apparatus 310.

The lens unit 320 is an optical focusing system which focuses the light passing through the light transmitting portion of the base plate 312 on the image sensor 330. The lens unit 320 may be composed of one or more lenses, and include a device that can adjust the focal distance of the imaging device A. An additional lens unit (not shown) may be further disposed over the light screening apparatus 310.

The image sensor 330 receives the light passing through the light transmitting portion and forms images, and the image sensor 330 may have a plurality of pixels. The image sensor 330 used with the exemplary embodiments described herein is not limited a certain type. For example, the image sensor 330 may be a Complementary Metal Oxide Semiconductor (CMOS) image sensor, a Charge Coupled Device (CCD), or another type of image sensor as would be understood by one of skill in the art. When the rollup blades 314 are in the flattened state, the entire light transmitting portion is covered by the rollup blades 314 and the image sensor 330 receives no light.

Figure 8A:
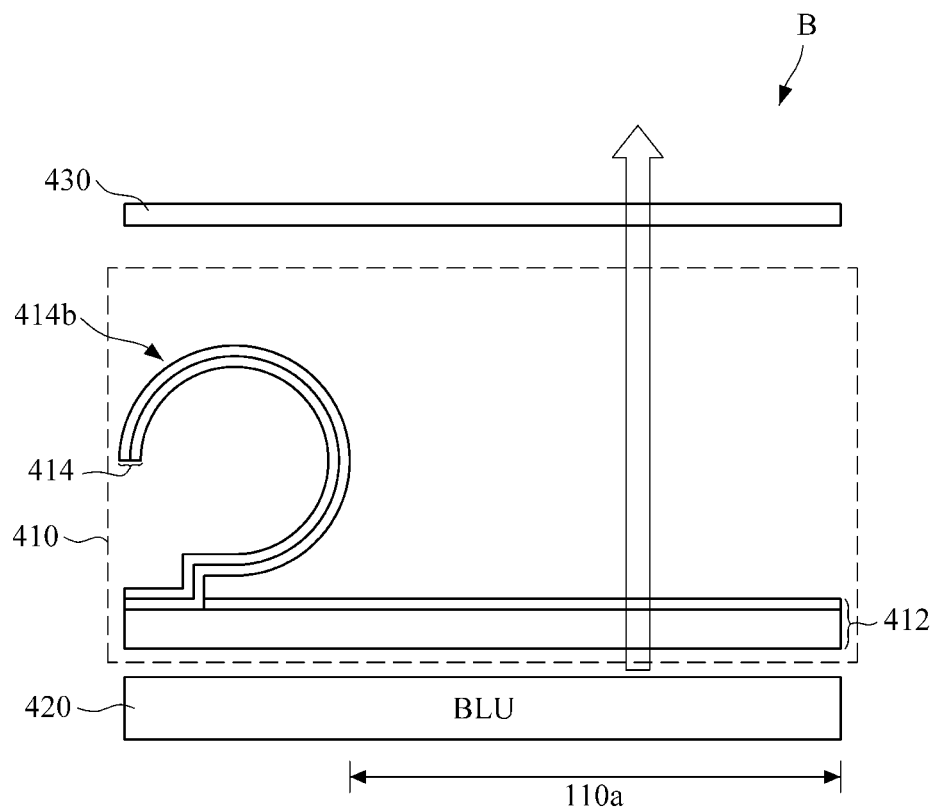
FIGS. 8A and 8B are cross-sectional views illustrating the reflection-transmission combination type display of FIGS. 7A and 7B when the reflection-transmission combination type display operates in a transmission mode.
Figure 8B:
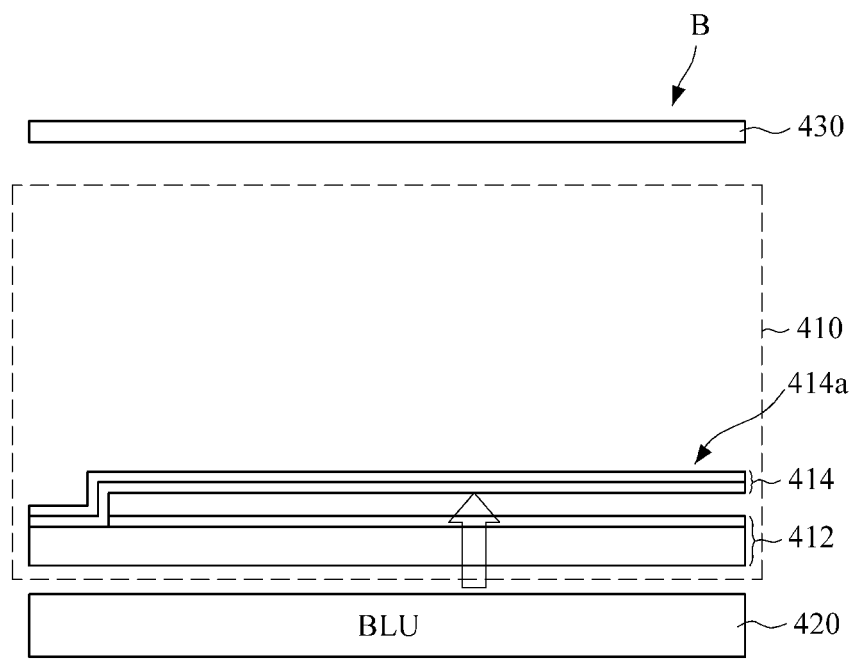

FIGS. 7A, 7B, 8A, and 8B show cross-sectional views of an exemplary embodiment of a reflection-transmission combination type display a light screening apparatus. In FIGS. 7A and 7B, cross-sectional views illustrate the reflection-transmission combination type display operating under a reflection mode. In FIGS. 8A and 8B, cross-sectional views illustrate the reflection-transmission combination type display operating under a transmission mode. Referring to FIGS. 7A, 7B, 8A, and 8B, the reflection-transmission combination type display B includes the light screening apparatus 410, a back light unit (BLU) 420, and a color filter 430. The light screening apparatus 410 may be similar to the light screening apparatus 100 illustrated in FIGS. 1, 2A, and 2B or may be a light screening apparatus according to another embodiment described herein. In FIGS. 7A and 7B, a driving unit of the light screening apparatus 410 is not illustrated for simplicity of drawing. The configurations or kinds of the back light unit 420 and the color filter 430 are not limited to a certain type and a configuration.

The cross-sectional views in FIGS. 7A, 7B, 8A, and 8B schematically illustrate the configuration of a unit pixel in the reflection-transmission combination type display. Referring to FIGS. 7A, 7B, 8A, and 8B, the light screening apparatus 410 may be provided for each pixel, but it is not essential for all pixels to include the light screening apparatus 410. The term "unit pixel" is a unit with respect to a display surface or with respect to the color filter 430. When the unit pixel is a unit corresponding to the display surface, the color filter 430 of the unit pixel may include all primary colors (e.g. red, green and blue (RGB)). On the other hand, when the unit pixel is a unit corresponding to the color filter, the color filter 430 of the unit pixel may include one of the primary colors (e.g. R, G, or B).

When the reflection-transmission combination type display operates in the reflection mode, as illustrated in FIGS. 7A and 7B, the display uses the light incident from the outside and then reflected by the light screening apparatus 410 as a light source. The light screening apparatus 410 of the reflection-transmission combination type display may include a rollup blade 414 whose upper surface is a reflection surface (see FIG. 4). When the reflection-transmission combination type display operates under the reflection mode, the back light unit 420 may be in a turned-off state. Referring to FIG. 7A, when the rollup blade 414 is flattened in the reflection mode, most of incident light is reflected by the rollup blade 414 and thereby the corresponding pixel becomes bright. On the other hand, when the rollup blade 414 is rolled up, as shown in FIG. 7B, under the reflection mode, there is no or little reflected light so that the corresponding pixel becomes dark. In addition, the rollup blade 414 may have a lower surface (i.e. an outer circumference surface) that is an anti-reflection surface, which may minimize deterioration of visibility by reducing undesired light reflection from the outer circumference surface of the rollup blade 414 when the rollup blade 414 is in the rolled-up state as shown in FIG. 7B.

When the reflection-transmission combination type display operates under a transmission mode as illustrated in FIGS. 8A and 8B, the light emitted from the back light unit 420 is used as a light source. Referring to FIG. 8A, most of light from the back light unit 420 is emitted to the outside when the rollup blade 414 is in the rolled-up state. The rollup blade 414 may have the lower surface (i.e. the outer circumference surface) that is an anti-reflection surface, in order to minimize deterioration of visibility due to undesired light reflection from the outer circumference surface of the rolled-up rollup blade 414. As illustrated in FIG. 8B, when the rollup blade 414 is in the flattened state, light emitted from the back light unit 420 is blocked so that the corresponding pixel becomes dark.

The driving unit (not shown) of the light screening apparatus 410 controls the state of the rollup blade 414 between the rolled-up state and the flattened state. According to an exemplary embodiment, the reflection-transmission combination type display transmits or blocks light emitted from the back light unit 420 in the transmission mode, and reflects or does not reflect light incident from the outside in the reflection mode to control the amount of light provided for each pixel. The driving unit may be able to operate a plurality of rollup blades individually or simultaneously, where the plurality of the rollup blades may be arranged in a matrix form corresponding to a plurality of pixels.

In addition, the driving unit of the light screening apparatus 410 may control the time that the rollup blade 414 spends in a certain state (e.g. in the rolled-up state, or in the flattened state) and/or a degree of rolled-up or flattened of the rollup blade 414 to control the amount of light provided for each pixel. In more detail, the brightness of each pixel of the reflection-transmission combination type display may be proportional to the amount of time that the rollup blade 414 is in the rolled-up state under the transmission mode, and may be proportional to the amount of time that the rollup blade 414 is in the flattened state under the reflection mode. Accordingly, the driving unit of the light screening apparatus 410 may display a gray scale of the corresponding pixel by adjusting an average amount of time that the rollup blade 414 is in the flattened state for each given time frame (i.e. a predetermined time period).

Figure 9A:
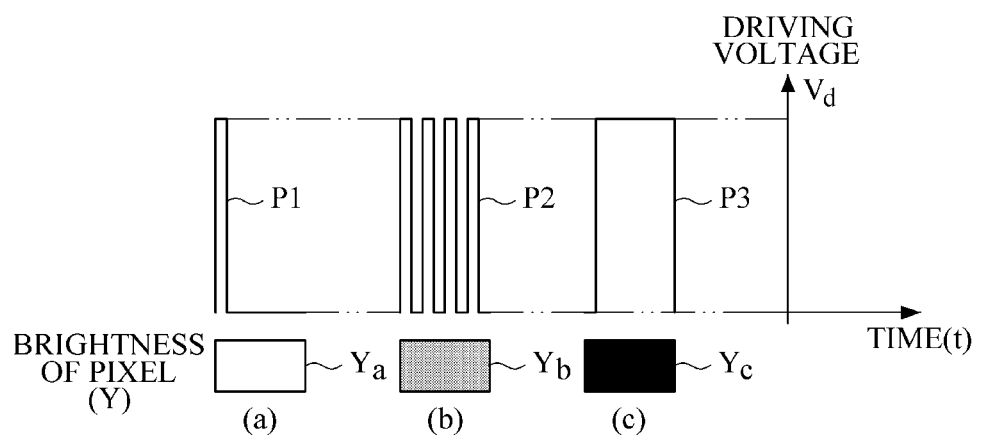
FIG. 9A shows an exemplary method of representing a gray scale of each pixel when a display device according to an exemplary embodiment operating in a transmission mode.
Figure 9B:
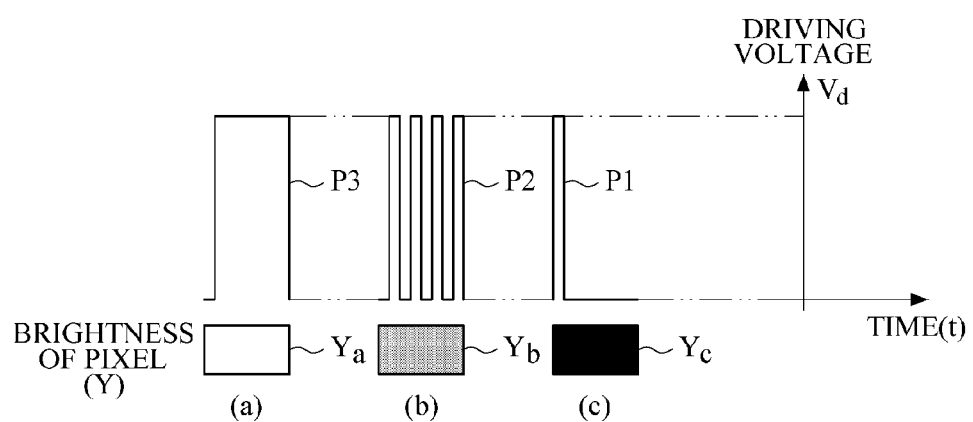
FIG. 9B shows an exemplary method of representing a gray scale of each pixel when a display device according to an exemplary embodiment operating in a reflection mode.

FIGS. 9A and 9B show exemplary methods of representing the gray scale of each pixel when the reflection-transmission combination type display operates in the transmission mode and in the reflection mode, respectively. In the examples illustrated in FIGS. 9A and 9B, rectangles at the bottom schematically show the brightness Y of a pixel. The brightness Ya of the pixel is the highest as shown in FIG. 9A (a), the brightness Yc of the pixel is lowest as shown in FIG. 9A (c), and the brightness Yb is between the brightness Ya and the brightness Yc. In addition, a diagram above each rectangle shows a pulse shape of a driving voltage Vd which is applied to the pixel for a predefined period of time. An average driving time of a pulse P1 for which the driving voltage is applied is the shortest in 9A (a) and 9B (c) (the average driving time may be 0), the average driving time of a pulse P3 is the longest in 9A (c) and 9B (a), and the average driving time of a pulse P2 for (b) shown in FIG. 9A and for (b) shown in FIG. 9B is between the average driving times of the pulse P1 and the pulse P2. Referring to FIGS. 8A, 8B, and 9A, the reflection-transmission combination type display operates under the transmission mode. The brightness of a pixel is the lowest as shown in FIG. 9A (c) when the driving voltage is applied and the corresponding rollup blade 414 is in the flattened state continuously. On the other hand, the brightness of the pixel is the highest as shown in FIG. 9A (a) when there is no driving voltage and the corresponding rollup blade 414 is in the rolled-up state. Therefore, the brightness of each pixel is inversely proportional to an average driving time (i.e. the average driving times for (a), (b) and (c) are (a)<(b)<(c)) for which the driving voltage is applied and thus the rollup blade 414 is in the flattened state for a given time frame(s). In FIGS. 7A, 7B, and 9B, the reflection-transmission combination type display operates under the reflection mode. The brightness of a pixel is the lowest as shown in FIG. 9A (c) when there is no driving voltage and thus a corresponding rollup blade 414 is in the rolled-up state. On the other hand, the brightness of the pixel is the highest as shown in FIG. 9A (a) when the driving voltage is applied and the corresponding rollup blade 414 is in the flattened state continuously. Therefore, the brightness of each pixel is proportional to an average driving time (i.e. the average driving times for (a), (b) and (c) are (a)>(b)>(c)) for which the driving voltage is applied and the rollup blade 414 is in the flattened state for a given time frame(s). Referring to FIGS. 9A and 9B, the same gray scale (see, FIG. 9A (b) and FIG. 9B (b)) may be obtained under the transmission mode and the reflection mode with opposite driving voltage signals. Accordingly, switching between the transmission mode and the reflection mode of the reflection-transmission combination type display may be easily performed by inverting a driving voltage signal applied by the driving unit.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A light screening apparatus comprising:
a base plate comprising a lower electrode;
a rollup blade comprising upper electrode; and
a driving unit electrically connected to the lower electrode and the upper electrode,
wherein the rollup blade is positionable into a flattened position in which the rollup blade covers a light transmitting portion of the base plate and a rolled-up position;
wherein the rollup blade comprises at least two layers having different optical properties, wherein the at least two layers comprises a layer comprising an anti-reflection surface defining a convex surface of the rollup blade in the rolled-up position;
and wherein the layer comprising the anti-reflection surface comprises an optical black layer.

2. The light screening apparatus of claim 1, wherein the at least two layers of the rollup blade comprise at least one metal absorption layer and at least one dielectric layer.

3. The light screening apparatus of claim 1, wherein the driving unit drives the rollup blade to move the rollup blade between the flattened position and the rolled-up position, thus adjusting an amount of light passing through the light transmitting portion.

4. The light screening apparatus of claim 1, where the optical black layer has a multi-layered structure comprising at least two different materials.

5. The light screening apparatus of claim 1, wherein the optical black layer comprises at least one metal absorption layer and at least one dielectric layer.

6. The light screening apparatus of claim 1, wherein the optical black layer has reflectance of about 20% or less with respect to visible light.

7. The light screening apparatus of claim 1, wherein the rollup blade comprises at least three layers.

8. The light screening apparatus of claim 7, wherein the at least three layers of the rollup blade comprises a metal absorption layer.

9. The light screening apparatus of claim 8, wherein the metal absorption layer is formed of at least one of Cr and Mo.

10. The light screening apparatus of claim 7, wherein the at least three layers of the rollup blade comprises at least two phase compensation layers and a light absorption layer disposed between the at least two phase compensation layers.

11. The light screening apparatus of claim 7, wherein the at least three layers of the rollup blade comprises a dielectric layer.

12. The light screening apparatus of claim 1, wherein the upper electrode is formed of at least one of Cr, Al, Au, Mo, and an opaque polymer.

13. The light screening apparatus of claim 1, wherein the rollup blade comprises a fixing portion and a moving portion, the fixing portion is fixed to the base plate outside of the light transmitting portion, and the moving portion is rolled up toward the fixing portion when the rollup blade is in the rolled-up position.

14. The light screening apparatus of claim 13, wherein convex surface of the moving portion, when the rollup blade is in the rolled-up position, is the optical black layer.

15. The light screening apparatus of claim 1, wherein the at least two layers comprise a layer comprising a reflection surface as an inner circumferential surface of the rollup blade when the rollup blade is in the rolled-up position and the optical black layer as the convex surface of the rollup blade when the rollup blade is in the rolled-up position.

16. The light screening apparatus of claim 15, wherein the layer comprising the reflection surface is a light reflection layer disposed on the upper electrode.

17. The light screening apparatus of claim 1, wherein the base plate further comprises a substrate which is formed of a transparent or translucent material.

18. The light screening apparatus of claim 1, wherein the substrate is formed of at least one of glass, quartz, plastic, and silica.

19. The light screening apparatus of claim 17, wherein the lower electrode is formed of at least one of Indium Tin Oxide (ITO), ZnO, SnO2, Carbon Nano Tube (CNT), and a conductive polymer.

20. An imaging device comprising:
an image sensor;
a base plate disposed over the image sensor and comprising a lower electrode;
a plurality of rollup blades each comprising a upper electrode; and
a driving unit electrically connected to the lower electrode and the upper electrode, wherein a light transmitting portion of the base plate is disposed in correspondence to the image sensor, the plurality of rollup blades are positionable into a flattened position in which the plurality of rollup blades cover the light transmitting portion of the base plate and a rolled-up position; and
wherein each of the plurality of rollup blades comprises at least two layers having different optical properties,
wherein the at least two layers comprises a layer comprising an anti-reflection surface defining a convex surface of the rollup blade in the rolled-up position; and
wherein the layer comprising the anti-reflection surface comprises an optical black layer.

21. The imaging device of claim 20, wherein the at least two layers of each of the plurality of rollup blades comprise at least one metal absorption layer and at least one dielectric layer.

22. The imaging device of claim 20, wherein the driving unit drives the plurality of rollup blades into the rolled-up position, thus adjusting an amount of light incident on the image sensor.

23. The imaging device of claim 20, wherein each of the plurality of rollup blades comprises two phase compensation layers and a light absorption layer disposed between the two phase compensation layers.

24. The imaging device of claim 20, wherein each of the plurality of rollup blades comprise a fixing portion fixed to the base plate outside of the light transmitting portion, and a moving portion rolled up toward the fixing portion when the rollup blades are in the rolled-up position, wherein each of the plurality of rollup blades corresponds to one of a plurality of divided regions of the light transmitting portion, and wherein the light transmitting portion has a circular shape.

25. The imaging device of claim 20, wherein the at least two layers comprise a layer comprising a reflection surface as an inner circumferential surface of the rollup blade when the rollup blades are in the rolled-up position and the optical black layer as the convex surface of the rollup blade when the rollup blades are in the rolled-up position.

26. The imaging device of claim 25, wherein the layer comprising the reflection surface is a light reflection layer formed on the upper electrode.

27. A display comprising:
a back light unit;
a base plate disposed over the back light unit and comprising a lower electrode;
a rollup blade comprising a upper electrode;
a color filter disposed over the rollup blade; and
a driving unit electrically connected to the lower electrode and the upper electrode,
wherein the rollup blade is positionable into a flattened position in which the rollup blade covers a light transmitting portion of the base plate and a rolled-up position, the driving unit drives the rollup blade to position the rollup blade in the flattened position or the rolled up position, thereby adjusting and amount of light passing through the light transmitting portion, and the rollup blade comprises at least two layers having different optical properties, and
wherein the at least two layers comprise a layer comprising a reflection surface as an inner circumferential surface of the rollup blade when the rollup blade is in the rolled-up position and a layer comprising an anti-reflection surface as a convex surface of the rollup blade when the rollup blade is in the rolled-up position.

28. The display of claim 27, where the at least two layers comprise at least one metal absorption layer and at least one dielectric layer.

29. The display of claim 27, wherein the driving unit controls the rollup blade to be in a transmission mode and a reflection mode,
wherein, in the transmission mode, the rollup blade is in the rolled-up position, and
wherein, in the reflection mode, the rollup blade is in the flattened position.

30. The display of claim 27, wherein the rollup blade includes a fixing portion and a moving portion, the fixing portion is fixed to the base plate outside of the light transmitting portion, and the moving portion is rolled up toward the fixing portion when the rollup blade is in the rolled-up position.

31. The display of claim 30, wherein the driving unit adjusts an average time for which the moving portion of the rollup blade is in the flattened position for given frames.

32. A light screening apparatus comprising:
a base plate comprising a lower electrode;
an array of a plurality of rollup-blades disposed on the base plate, each of the plurality of rollup blades comprising an upper electrode and an optical black layer, wherein the upper electrode and the optical black layer have different optical properties; and
a driving unit which applies a driving force between the lower electrode and the upper electrode to move each of the plurality of rollup blades from a first, rolled-up position, into a second, flattened position in which the plurality of rollup blades covers a light transmitting portion of the base plate;
wherein the optical black layer comprises a first phase compensation layer, a second phase compensation layer, and a light absorption layer disposed between the first phase compensation layer and the second phase compensation layer.

33. A light screening apparatus comprising:
a base plate comprising a lower electrode;
an array of a plurality of rollup blades disposed on the base plate, each of the plurality of rollup blades comprising an upper electrode of a first material, a first phase compensation layer of a second material, an absorption layer of the first material, and a second phase compensation layer of a second material, wherein the first material has optical characteristics different from optical characteristics of the second material;
wherein each of the plurality of rollup blades is positionable into a first, rolled-up position and a second, flattened position, such that when the plurality of rollup blades are in the first position, an aperture is formed therebetween.

34. The display of claim 27, wherein the display further comprises a color filter disposed over the rollup blade.

35. The display of claim 34, wherein the rollup blade comprises a plurality of rollup blades,
wherein each of the plurality of rollup blades is arranged to correspond to one of a plurality of pixels of the color filter, and
wherein the driving unit drives the plurality of rollup blades individually.

* * * * *